May 28, 1968 HAYATOSI YAMADA 3,386,037
PHASE ANGLE TRIGGERING CONTROL FOR AN SCR, FOR EXAMPLE
Filed Sept. 9, 1964 4 Sheets-Sheet 1
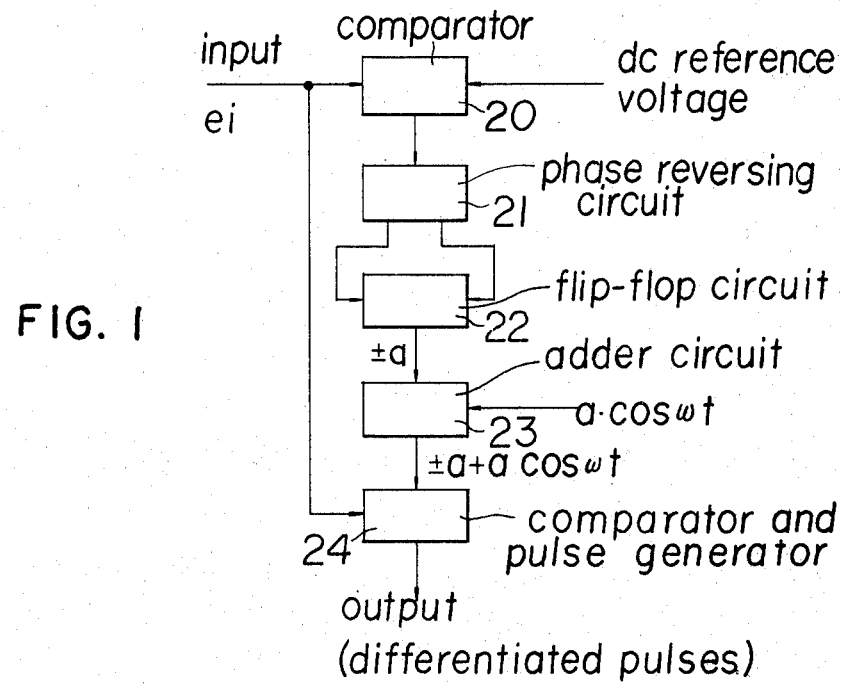
FIG. 1
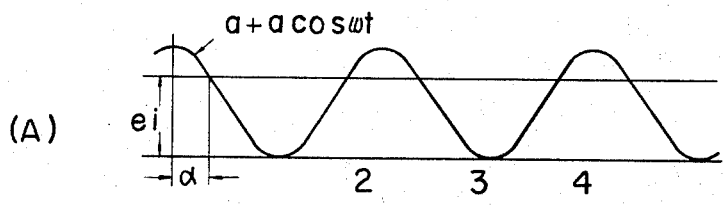
(A)
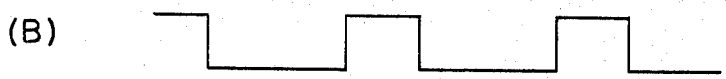
(B)
FIG. 2
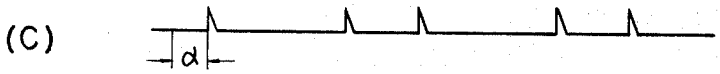
(C)
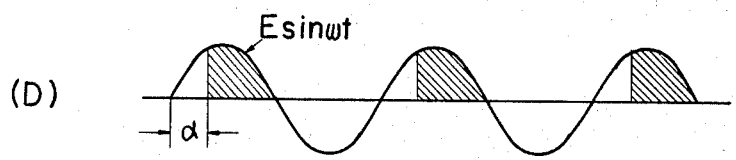
(D)
INVENTOR.
HAYATOSI YAMADA

United States Patent Office 3,386,037
Patented May 28, 1968

3,386,037
PHASE ANGLE TRIGGERING CONTROL FOR
AN SCR, FOR EXAMPLE
Hayatosi Yamada, Ohta-ku, Tokyo, Japan, assignor to
Tokyo Shibaura Electric Co., Ltd., Kawasaki-shi, Japan,
a corporation of Japan
Filed Sept. 9, 1964, Ser. No. 395,223
Claims priority, application Japan, Sept. 12, 1963,
38/48,075
5 Claims. (Cl. 328—134)

ABSTRACT OF THE DISCLOSURE

To provide pulses triggering phase sensitive rectifiers, such as SCR's, and the like from a DC input so that the output of the rectifiers will be directly proportional to input, input signals are compared with a reference to provide a modified, constant output, added in an adder to cosine wave and compared again with the input to obtain output pulses having a phase position which, when the rectifier is triggered, will provide a rectified output directly proportional to input potential, the double comparison and addition of a cosine wave in the circuit eliminating non-linearities.

---

This invention relates to an electric valve control device and more particularly to a control device for a control electrode of an electric valve such as a thyratron, an immersion igniter type vapor discharge valve, silicon controlled rectifier element or the like which is connected between a source of alternating current voltage and a load.

Such a control device usually comprises a control circuit responsive to a variable DC control voltage to produce a variable phase pulse voltage so as to vary the ignition time or conduction phase angle in the respective positive half cycles of the AC voltage applied to the anode electrode of the rectifier element. The area S of the portion in the respective positive half cycles during which the electric valve or rectifier element conducts current is represented by the following equation::

$$S = \int_\alpha^\pi E \sin \omega t + d\omega t \qquad (1)$$

and the mean DC output voltage $\bar{e}$ is applied to the load-is given by $$\bar{e} = \frac{1}{2\pi} \int_\alpha^\pi E \sin \omega t + d\omega t = \frac{E}{2\pi}(1 + \cos \alpha) \qquad (2)$$

While the variable DC output voltage $\bar{e}$ represented by the Equation 2 is a function of the conduction phase angle $\alpha$ of the controlled rectifier element, it will be noted from the Equation 2 that the DC output voltage $\bar{e}$ is not directly proportional to the control input voltage $ei$ even when the conduction phase angle $\alpha$ is made to vary in proportion to the control input voltage $ei$ applied to the control circuit.

However, in usual control devices or systems it is often desirable to make the output quantity to be proportional to the input quantity, but with the conventional electric valve control device it has been impossible to meet this requirement.

It is therefore an object of this invention to provide a new and improved control circuit for an electric valve having a control electrode which can produce an output DC voltage from the electric valve which is proportional to a DC control voltage. From the above mentioned Equation 2, the relation between the conduction phase angle $\alpha$ and the DC control input voltage $ei$ can be expressed as follows $$\alpha = \cos^{-1}\left(\frac{ei}{a} - 1\right) \qquad (3)$$

where $a$ represents a constant. By substituting Equation 3 in the Equation 2

$$\bar{e} = \frac{E}{2\pi a} ei \qquad (4)$$

This equation shows that the DC output voltage $\bar{e}$ is directly proportional to the DC control input voltage $ei$ and that the proportionality constant is equal to $E/2\pi a$. It follows that so long as the DC control input voltage $ei$ and the conduction phase angle $\alpha$ are maintained to satisfy the condition of Equation 3 the DC output voltage (hereinafter termed merely as the output voltage) will be proportional to the DC control input voltage (hereinafter termed as the input voltage).

Thus, it is a more specific object of this invention to provide a novel control device for an electric valve having a control electrode which can render conductive said electric valve at a phase angle or conduction phase angle $$\alpha = \cos^{-1}\left(\frac{ei}{a} \mp 1\right)$$

These and further objects of this invention can be attained by providing in accordance with this invention a control device or circuit comprising a first comparator adapted to compare a variable DC control input voltage and a DC reference voltage, a phase reversing circuit controlled by the output from the comparator, a flip-flop circuit responsive to the output from the phase reversing circuit, an adder circuit means to add the output from the flip-flop circuit and a cosine wave AC voltage which is synchronous with a source of AC supply to energize a load through the electric valve, and a second comparator to compare the output from the adder circuit means and the DC control input voltage to provide a control voltage for the electric valve at a phase angle where the output from the adder circuit means and the DC control input voltage are equal.

According to a modified embodiment of this invention there is provided a control device comprising a source of sine wave voltage, a cosine wave generator, a rectangular wave generator, said generators being energized by the source of sine wave voltage, an adder to add the outputs from the cosine wave and rectangular wave generators and a comparator to compare the output from the adder and a variable DC control voltage to provide an output at a phase angle where said output from the adder and variable DC control voltage are equal.

The features of the invention which are believed to be novel are pointed out with particularity in the claims which are appended to and forming a part of this specification. However, the invention, together with its organization and further objects and advantages thereof, may best be understood by reference to the following description taken in connection with the accompanying drawings, in which FIG. 1 is a block diagram of a control device constructed according to this invention;

FIGS. 2 and 3 show various curves useful to explain the operation of the control device shown in FIG. 1;

Figure 3:
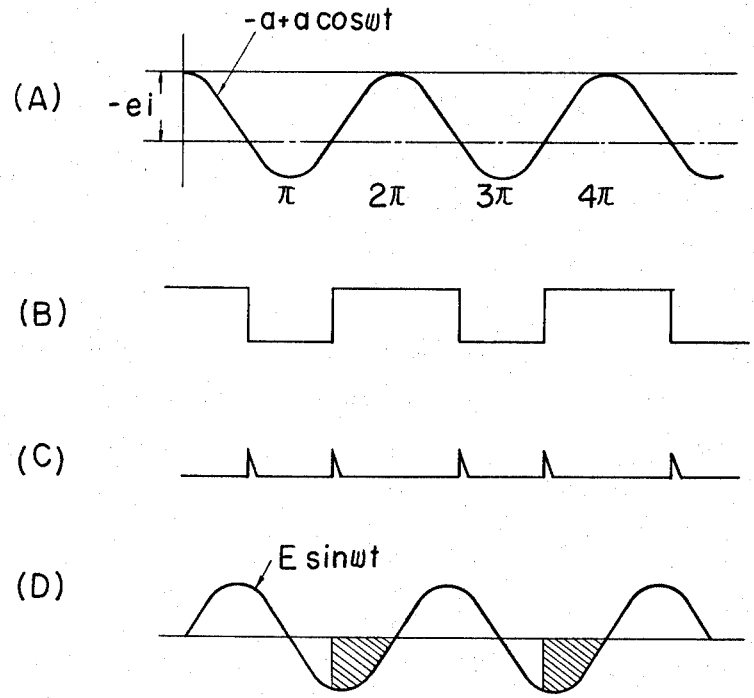

Referring now to the accompanying drawings, FIG. 1 illustrates one example of a block diagram of a pulse generating circuit constructed in accordance with this invention to generate control pulses for a grid controlled electric valve such as a controlled rectifier element having a phase angle $\alpha$ as determined by the equation 3. The pulse generating circuit shown in FIG. 1 comprises a first comparator 20, a phase reversing circuit 21, a flip-flop circuit 22, an adder circuit 23 including a wave form shaping circuit, and a second comparator 24 including a wave form shaping circuit and a differentiating circuit in effect forming a pulse generator.

The operation of the pulse generating circuit shown in FIG. 1 will now be considered by referring to FIGS. 2 and 3. At the time of starting, or when the input $ei$ is zero, the pulse generating circuit is constructed such that the flip-flop circuit 22 will provide an output equal to the constant $a$. The input voltage $ei$ is compared with a variable DC reference voltage (set at zero volt) by the first comparator 20. When the input voltage $ei$ is positive, the output of the first comparator 20 will be zero so that the output from the flip-flop circuit 22 will be maintained constant which is equal to $a$. On the other hand when the input voltage $ei$ is negative the first comparator 20 will provide an output which is effective to operate through the phase reversing circuit 21 to reverse the output of the flip-flop circuit 22 from $a$ to $-a$. As shown in FIG. 1, a voltage $a \cdot \cos \omega t$, which is synchronous with an AC source voltage $E \sin \omega t$ (shown in FIG. 2D) utilized to energize a load through the electric valve is applied to the adder circuit 23. As mentioned above, as the output from the flip-flop circuit 22 is equal to $a$ so long as the input voltage $ei$ is positive, the adder 23 will provide an output $a + a \cos \omega t = a(1 + \cos \omega t)$ which is compared with the input voltage $ei$ within the second comparator 24, as shown in FIG. 2A. At point where $ei$ is equal to $a(1+\cos \omega t)$, that is, or at points of intersection between a straight line representing $ei$ and a curve representing $a(1+\cos \omega t)$ the comparator 24 will generate pulses as shown in FIG. 2B. The comparator further contains a wave form shaping circuit to provide differentiated pulses as shown in 2C. The pulses of FIG. 2C are utilized to control the grid controlled rectifier to energize the load during the shaded portion of each of the positive half waves of the source voltage as seen in FIG. 2D.

When the input voltage $ei$ is negative the operation of the control circuit is substantially the same as that described above except that the output from the flip-flop circuit 22 is $-a$. Thus $-a$ and $a \cdot \cos \omega t$ are simultaneously applied to the adder circuit 23 to provide an output $(-a + a \cdot \cos \omega t)$ which is compared with the input voltage $-ei$ (FIG. 3A). The operation of the control circuit is similar to that discussed above, and FIGS. 3A to 3D inclusive have the same significance as FIGS. 2A to 2D; the negative portion of the wave will now become effective.

The fact that this circuit arrangement provides differentiated pulses from the second comparator, or, in other words, that the conduction phase angle $\alpha$ of the controlled rectifier element is related to the input voltage $ei$ as defined by the Equation 3, can be proven as follows.

Referring again to FIG. 2A, assuming now that the phase angle at a point where the input voltage $ei$ is equal to the input $a(1+\cos \omega t)$ is represented by $\alpha$, then the phase angle of the differentiated output from the comparator 24 will also be $\alpha$. Since the AC source voltage supplied to the load is synchronous with said input $a(1+\cos \omega t)$ the differentiated pulse output from the comparator 24 can render conductive the controlled rectifier element in series with the load at the conduction phase angle $\alpha$, as shown in FIG. 2D. With this phase angle $\alpha$, the following equation holds:

$$ei = a(1+\cos \alpha) \qquad (5)$$

From this Equation 5

$$\alpha = \cos^{-1}\left(\frac{ei}{a} - 1\right)$$

which is identical with the above mentioned Equation 3.

Thus, it will be clear that the control circuit constructed in accordance with this invention can provide a variable DC output voltage which is directly proportional to the DC control input voltage when pulses generated by the pulse circuit of FIG. 1 are applied to a control electrode of an electric valve device.

Figure 4:
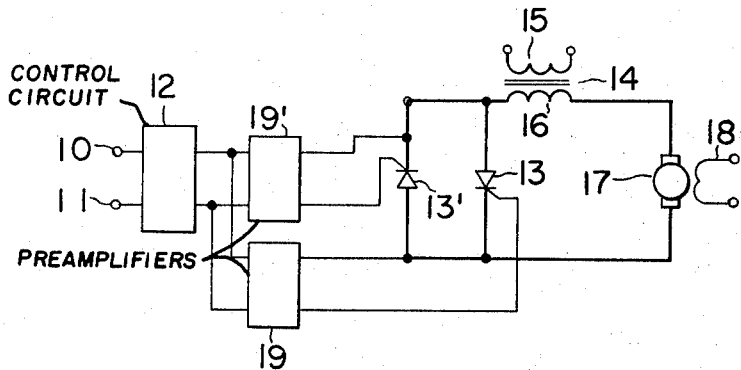
FIG. 4 is a connection diagram to illustrate an application of this invention to a reversible variable speed DC motor.

FIG. 4 represents a connection diagram of the control device embodying this invention as applied to a reversible speed control of a DC motor 17 having a separate excited field winding 18. Between a secondary winding 16 of a transformer 14 having a primary winding 15 and the DC motor 17 are connected a pair of reversely connected parallel grid controlled rectifiers, for instance, silicon controlled rectifier elements 13 and 13'. A control circuit 12 providing pulses having the same construction as that of FIG. 1 is provided to receive the control DC input voltage across its input terminals 10 and 11. Preamplifiers 19 and 19' are included between the pulse generator circuit 12 and the gate or control electrodes of the rectifier elements 13 and 13'. With this arrangement the speed of the motor 17 can be precisely controlled in proportion to the magnitude of the control voltage impressed across the input terminals 10 and 11, and the direction of rotation of the motor is determined by the polarity of the control input voltage.

Figure 5:
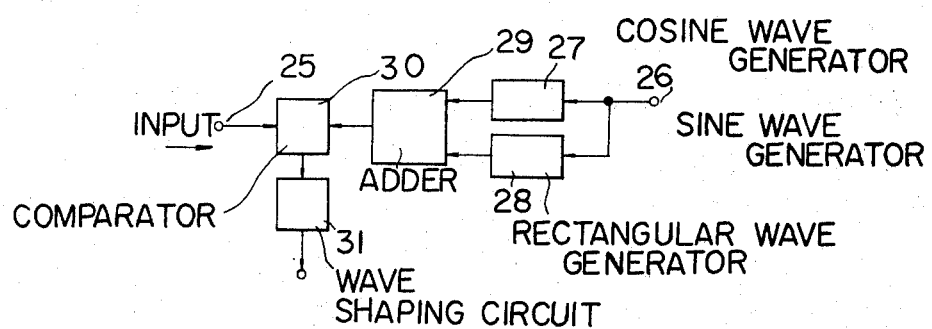
FIG. 5 is a block diagram of a modified embodiment of this invention.
Figure 7:
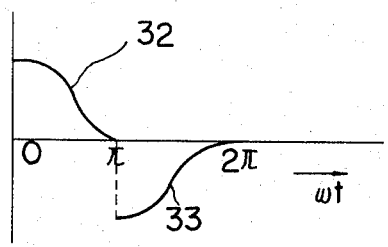
FIG. 7 shows a wave form of a reference voltage in a comparator employed in the circuit shown in FIG. 5.

FIG. 5 shows another embodiment of this invention wherein a pulse generating circuit or a linear pulse generating circuit comprises a comparator 30 having a terminal 25 supplied with the DC control input voltage, a cosine wave generator 27, a rectangular wave generator 28, said generators being energized by a sine wave AC voltage which is synchronous with the source AC voltage, an adder 29 which functions to add the outputs from the cosine wave generator and the rectangular wave generator and to supply the sum to the other input terminal of the comparator 30 and a wave shaping circuit 31 which functions to shape, differentiate and clip the output of the comparator 30. The reference wave utilized in the comparator 30 has wave forms 32 and 33, as shown in FIG. 7, which are represented by For $0 \leq \omega t < \pi$, $es = a(1+ \cos \omega t)$ (wave 32)

For $\pi \leq \omega t \leq 2\pi$ $es = a(-1+ \cos \omega t)$ (wave 33)

Figure 6:
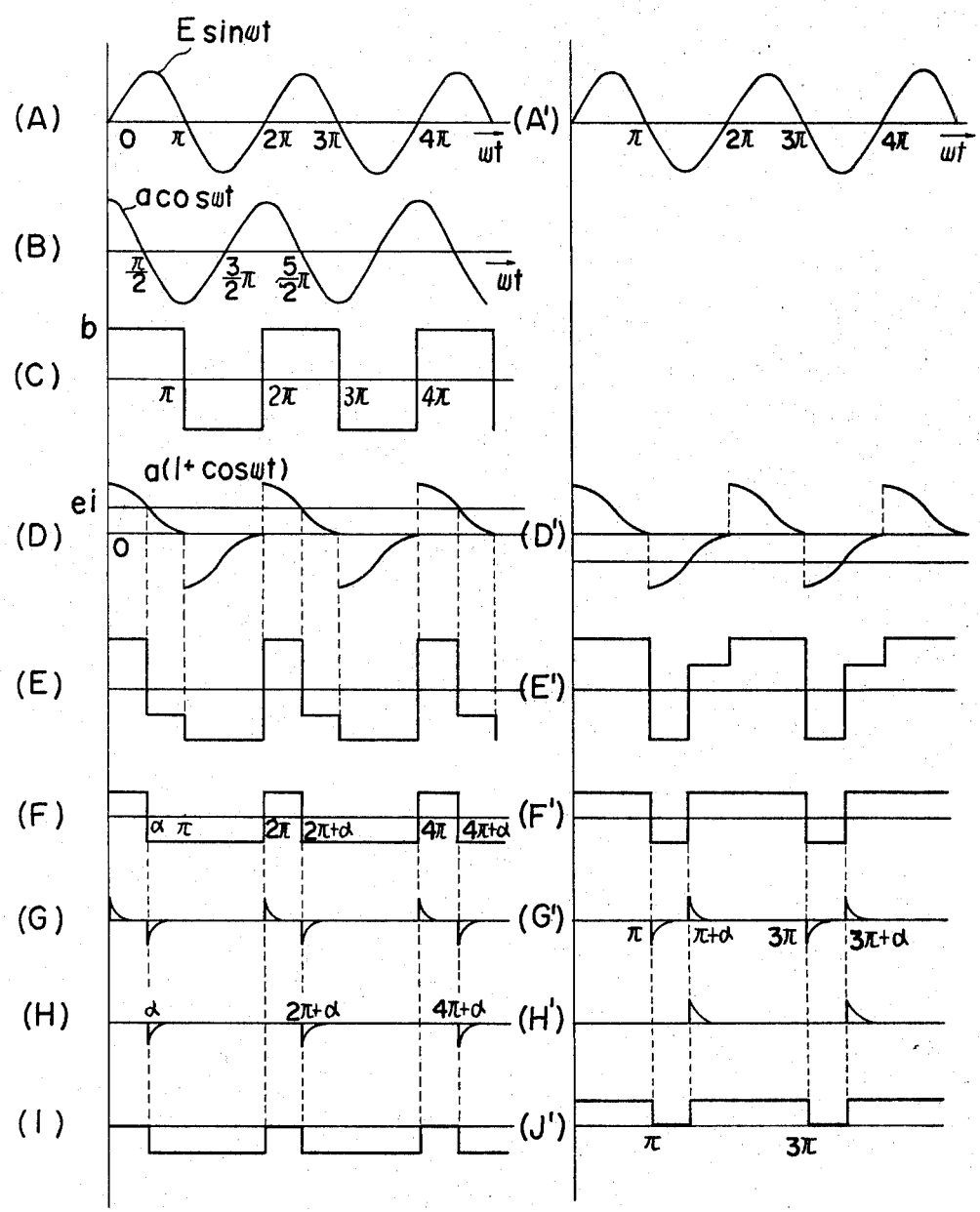
FIG. 6 shows a group of curves to explain the operation of the modified embodiment shown in FIG. 5.

Referring now to FIG. 6, the sine wave of the source of supply is shown in FIG. 6A, and the output waves from the cosine wave generator 27 and the rectangular wave generator 28 are shown in FIGS. 6B and 6C, respectively. The output of adder 29 is seen in FIG. 6D. The comparator 30 operates to compare the control voltage $ei$ (see line "$ei$" in FIG. 6D) and the output $a(1+ \cos \omega t)$ from the adder 29 to provide an output of the wave form as shown in FIG. 6E. At points where the DC input and the output from the adder are equal $$ei = a(1+\cos \omega t)$$

$$\therefore \alpha = \omega t = \cos^{-1}\left(\frac{ei}{a} - 1\right)$$

The latter equation is identical with the Equation 3. The output from the comparator is then shaped by means of a slicer to obtain a wave form as shown in FIG. 6F, which is differentiated (FIG. 6G) and clipped or rectified to pass one polarity only to provide pulses of the wave form as shown in FIG. 8H. As these, pulses are generated at phasas $\alpha$, $2\pi+\alpha$, $4\pi+\alpha$, they can control the controlled rectifier element to produce an output voltage, FIG. 6I, which is proportional to the input voltage $ei$.

Similarly where the input control voltage is negative, a condition $$\alpha = \omega t = \cos^{-1}\left(\frac{ei}{a}+1\right)$$

can be obtained as shown in FIGS. 6A' and 6D' to 6J' inclusive; it is to be noted that the *ei* line is now below the zero reference (FIG. 6D'), and that the clipper acts to pass pulses of polarity reversed with respect to FIG. 6H.

It should be understood that the control device of this invention can also be applied to full wave rectifiers, electric power control for electric furnaces and analogue computers and the like.

While the invention has been disclosed in preferred embodiments thereof, modifications to the disclosed embodiments of the invention and other embodiments thereof may occur to those skilled in the art which do not depart from the spirit and scope of the invention. Accordingly, it is intended to cover in the appended claims all such embodiments and modifications of the invention which do not depart from the spirit and scope of the invention.

What is claimed is:

1. In combination a source of alternating current, a load, an electric valve having a control electrode and connected between said source and load and a control device connected to said control electrode, said control device including a source of variable DC voltage and means responsive to said DC voltage to generate a control voltage for said control electrode which renders conductive said electric valve at a conductive phase angle $$\alpha = \cos^{-1}\left(\frac{ei}{a}\pm 1\right)$$

where $\alpha$ represents said conductive phase angle, *ei* said DC voltage and *a* a constant.

2. A control device for an electric valve having a control electrode to control conduction of said valve in accordance with a variable DC control signal, said control device comprising a source of sine wave voltage, a cosine wave generator, a rectangular wave generator, said generators being energized by said source of sine wave voltage, an adder connected to add the outputs from said cosine wave and rectangular wave generators; and a comparator and pulse generator circuit connected to compare, the output from said adder and said variable DC control voltage to provide output control pulses to control conduction of said valve at a phase angle where said output from said adder and said variable DC control voltage are equal.

3. A control device for an electric valve having a control electrode to provide trigger pulses for said control electrode at a phase angle such that the output of said valve will be directly proportional to a DC control input voltage, said control device comprising a first comparator having said variable DC control input voltage applied thereto;
a DC reference voltage applied to said comparator, said comparator comparing said control input voltage and said reference voltage;
a source of cosine wave AC voltage;
an adder circuit means to add the output from said first comparator circuit and said cosine wave AC voltage;
a second comparator and pulse generator circuit having the output from said adder circuit means and said DC control input voltage applied thereto to provide output pulses at a phase angle of said AC voltage at which the level of output from the adder means and said DC control input voltage are equal.

4. Control device according to claim 3 including a phase reversing circuit controlled by the output from said comparator and a flip-flop circuit responsive to the output from said phase reversing circuit, the output of said flip-flop circuit being connected to said adder and providing a steady state input, the polarity of said input depending upon the state of said flip-flop as determined by the phase reversal circuit connected to said comparator.

5. Control device as claimed in claim 3 wherein said electric valve is connected to an AC voltage source;
said DC control input voltage has a value *ei*;
said first comparator provides an output of a fixed value *a*, wherein *a* is a constant, the plurality of said output *a* being determined by the polarity of said DC control input voltage *ei*;
said cosine AC voltage having a value of $a \cdot \cos \omega t$;
said adder circuit means supplying an output $$\pm a + a \cdot \cos \omega t;$$

and said second comparator comparing the output from said adder circuit means and said DC control input voltage *ei* to provide an output for said control electrode at a phase angle $$\alpha = \cos^{-1}\left(\frac{ei}{a} \mp 1\right)$$

when said output from said adder circuit means and said DC control input voltage are equal.

References Cited

UNITED STATES PATENTS

| | | | |
|---|---|---|---|
| 2,929,927 | 3/1960 | Beloungie | 328—135 |
| 3,074,020 | 1/1963 | Ropiequet | 328—135 X |
| 3,242,416 | 3/1966 | White | 307—88.5 |
| 3,331,030 | 7/1967 | Jordan et al. | 328—134 X |

JOHN S. HEYMAN, *Primary Examiner.*